(12) United States Patent
Freire-Diaz et al.

(10) Patent No.: US 7,727,454 B2
(45) Date of Patent: Jun. 1, 2010

(54) DEVICE FOR TRANSFERRING ITEMS BY MEANS OF A GROUP MODULES HAVING VARIABLE SPACING

(75) Inventors: Philippe Freire-Diaz, Octeville sur Mer (FR); Sylvain Auvray, Octeville sur Mer (FR)

(73) Assignee: Sidel Participations, Octeville Sur Mer (FR)

( * ) Notice: Subject to any disclaimer, the term of this patent is extended or adjusted under 35 U.S.C. 154(b) by 530 days.

(21) Appl. No.: 11/812,136

(22) Filed: Jun. 15, 2007

(65) Prior Publication Data
US 2008/0310941 A1 Dec. 18, 2008

(51) Int. Cl.
*B29C 49/68* (2006.01)
*B29C 31/08* (2006.01)

(52) U.S. Cl. .................. 264/532; 198/468.3; 264/535; 414/226.01; 414/226.02; 425/526; 425/529; 425/534

(58) Field of Classification Search .............. 425/526, 425/529, 534; 264/532, 535; 198/468.3, 198/470.1, 474.1; 414/225.01, 226.01, 226.02
See application file for complete search history.

(56) References Cited

U.S. PATENT DOCUMENTS 4,241,009 A * 12/1980 Sokolow .................... 264/532
4,391,578 A * 7/1983 Schaar ...................... 425/525
5,643,619 A 7/1997 Oas et al.
5,753,279 A * 5/1998 Takada et al. .............. 425/526
6,457,967 B1 * 10/2002 Suzuki et al. .............. 425/526

FOREIGN PATENT DOCUMENTS

DE    200 09 075 U1    7/2001
EP    0 979 720 A      2/2000
FR    1 579 870 A      8/1969

* cited by examiner

*Primary Examiner*—Robert B Davis
(74) *Attorney, Agent, or Firm*—Sughrue Mion, PLLC

(57) ABSTRACT

The invention proposes a device (10) for transferring items (3) from an items (3) loading station (13) to an items (3) unloading station (14), which comprises: a group (18) of modules (19a-d) mounted such that they can move in a longitudinally direction, able to adopt a contracted configuration in which the modules (19a-d) are separated by a first spacing (pl), and a deployed configuration in which the modules (19a-d) are separated by a second spacing (F), means (34) of linking one module (19a) to another (19b), comprising a lever (38) mounted such that it is articulated on a first module (19b) and connected to a second module (19a), this lever (3) furthermore cooperating with a groove (46) having an intermediate section (46c) forming an angle with the direction of movement of the group (18) of modules (19a-d), and means (35, 36) of controlling the movement of the group (18). Application to the transfer of blanks from a heating station to a station for molding receptacles from blanks.

14 Claims, 10 Drawing Sheets

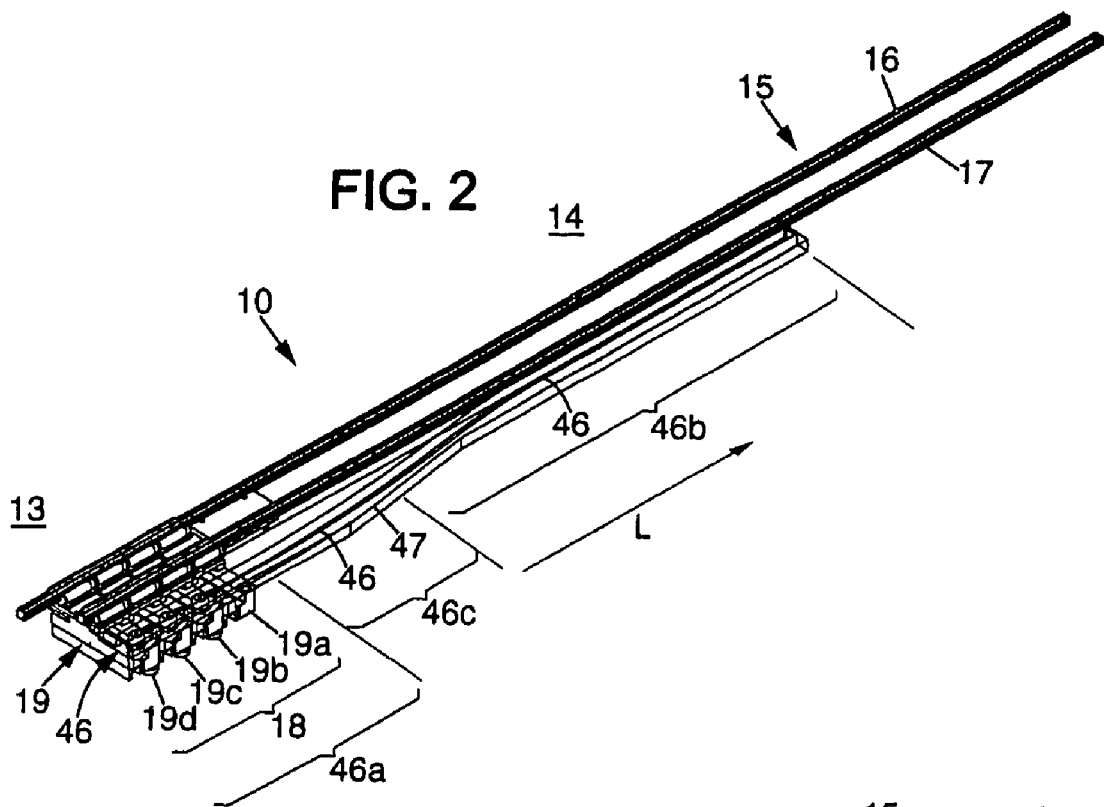
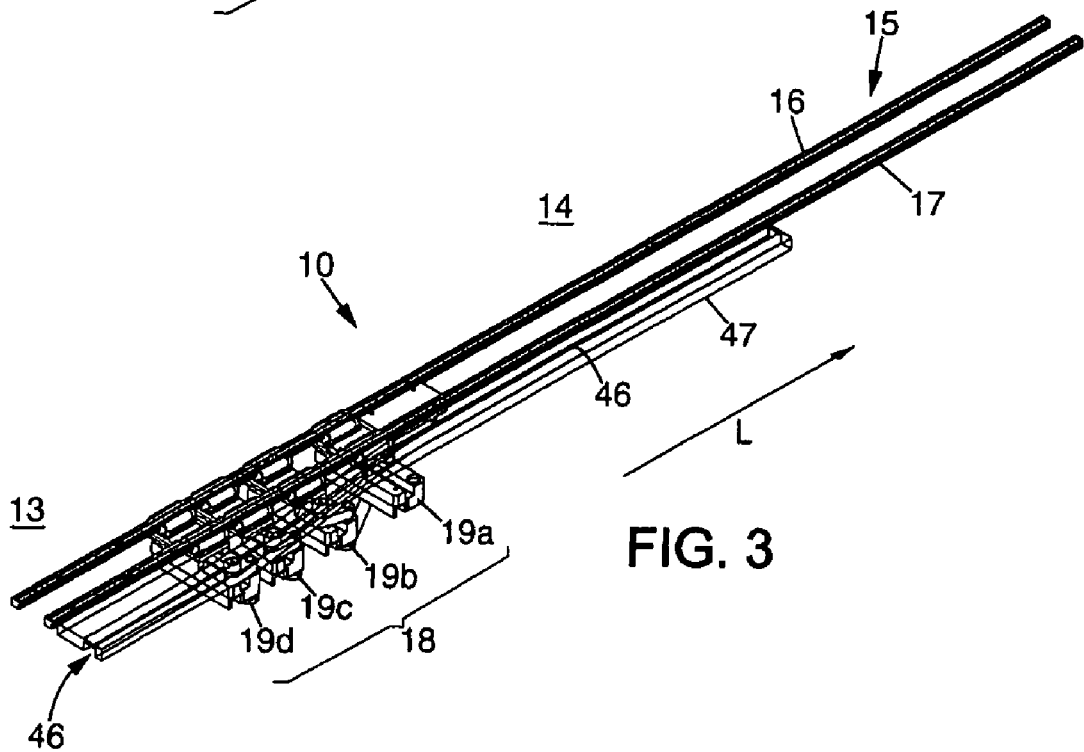

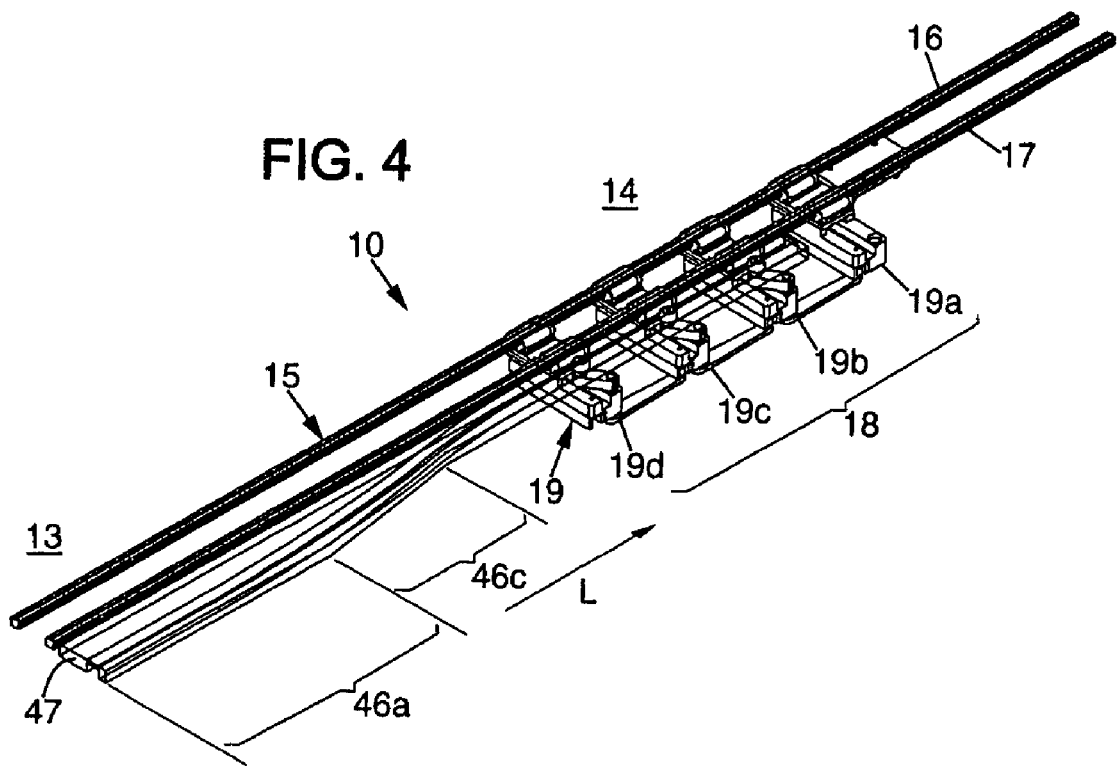
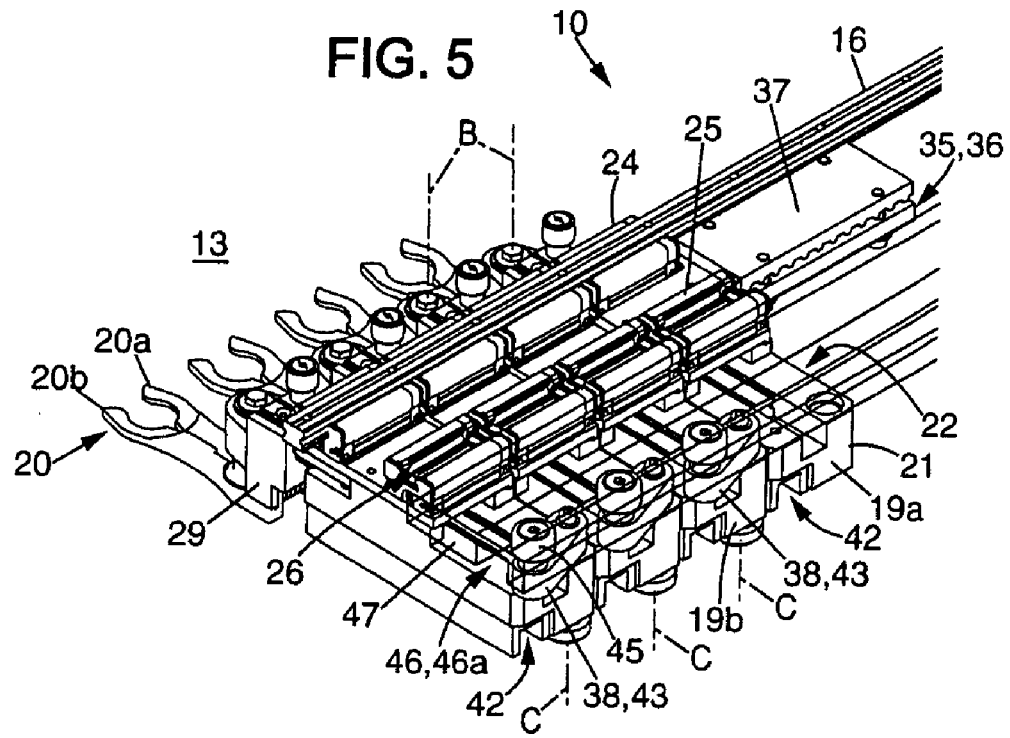

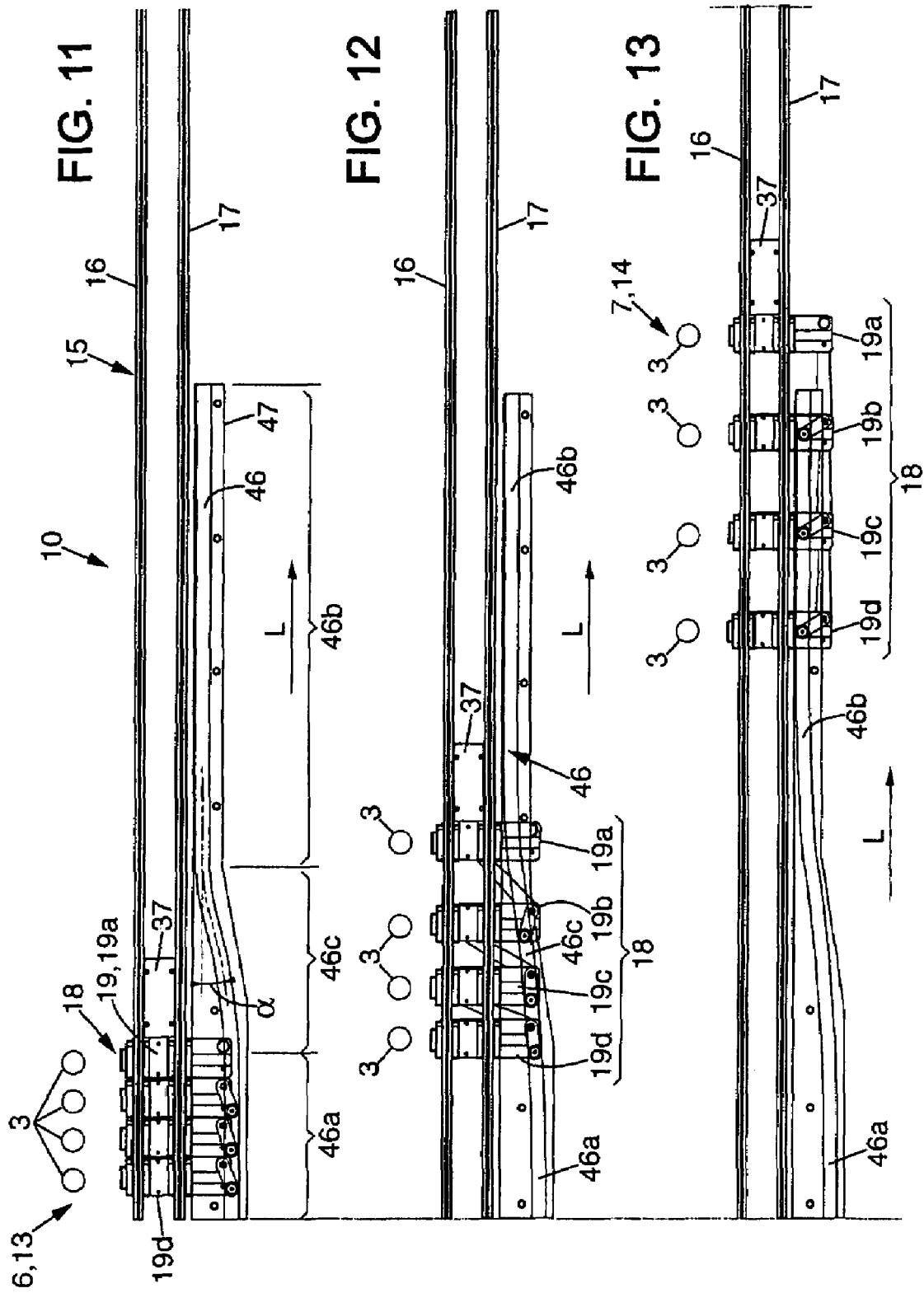

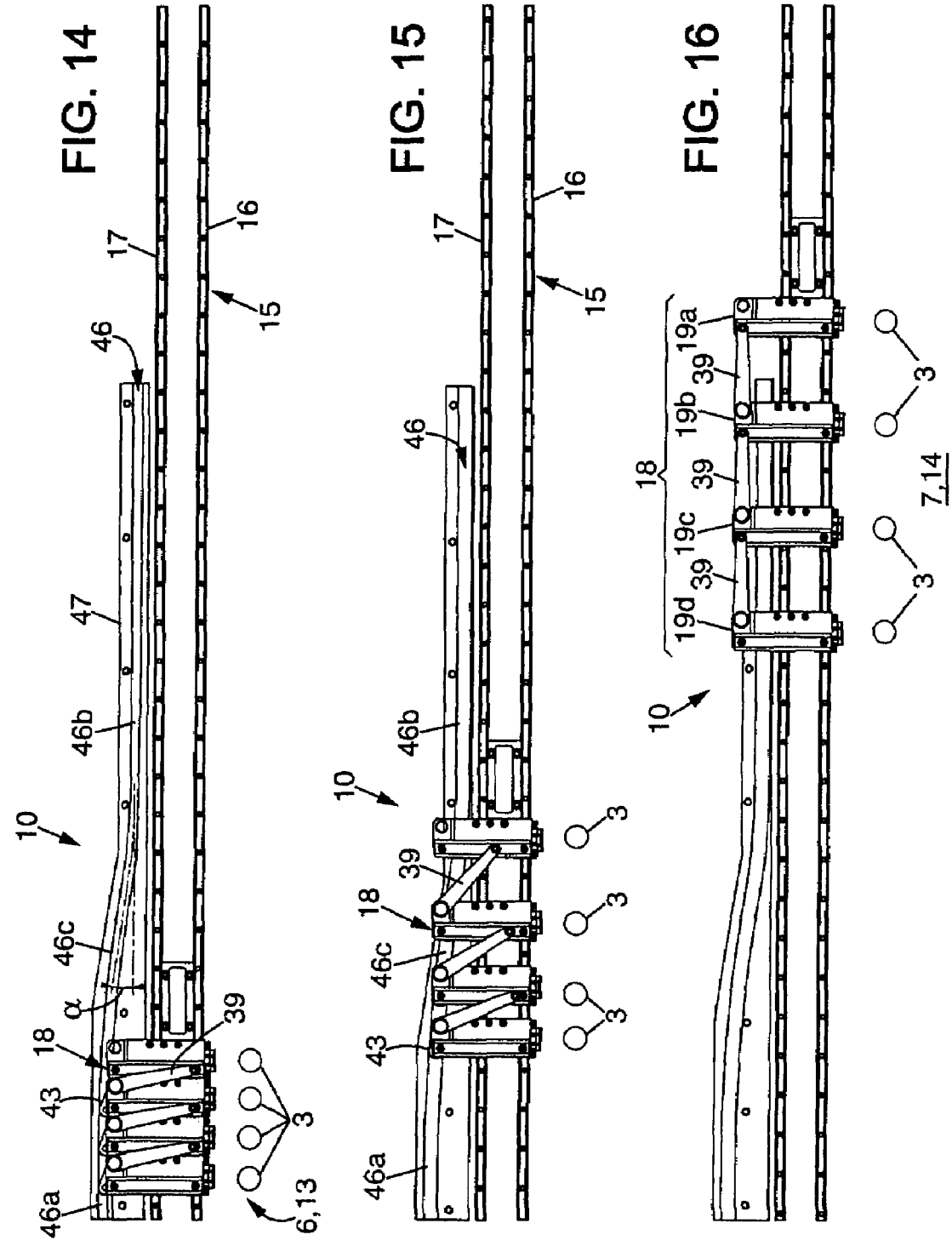

DEVICE FOR TRANSFERRING ITEMS BY MEANS OF A GROUP MODULES HAVING VARIABLE SPACING

The invention relates to the handling of items. More particularly it relates to the transfer of items from an items loading station to an items unloading station.

The problems with which inventors have been confronted are in the field of the manufacture of receptacles from blanks generally made from thermoplastic material. The latter are, in a so-called molding machine, heated in progress at a heating station, then transferred to a molding station where the receptacles are conjointly formed in groups from groups of hot blanks by blowing or by drawing-blowing.

At the heating station, the blanks progress in front of tubular infrared radiation lamps which heat them up. The blanks are transported side by side, the spacing between them, that is to say the distance between their respective axes, being as short as possible in order to maximize the heat efficiency of the heating station, which has a direct effect on the manufacturing cost of the receptacles.

On the other hand, at the molding station, the spacing between the blanks must be equal to the spacing between the axes of the mold impressions.

Consequently, it is necessary to modify the spacing between the blanks during the transfer of the blanks from the heating station to the molding station.

Several solutions have been proposed in the past in order to solve this problem.

The following are mentioned by way of example:
the document DE-200 09 075 U, which proposes modifying the spacing between blanks by means of an endless screw with continuously variable pitch;
the document EP-979 720, which proposes several ways of modifying the spacing between blanks: by means of a pantograph, or by means of jacks;
the document U.S. Pat. No. 5,643,619, which also proposes modifying the spacing between blanks by means of a pantograph which is designed to group the blanks in pairs.

These solutions are theoretically satisfactory. However, in practice, they prove to be complicated to implement and do not make it possible to obtain either a satisfactory reliability at a high rate, or to provide good flexibility in the transfer between the loading station and the unloading station, where the rates can vary substantially depending on parameters imposed by the production.

In order to overcome these disadvantages in particular, the invention proposes, according to a first aspect, a device for transferring items from an items loading station to an items unloading station, which comprises:
a group of modules mounted such that they can move in a longitudinal direction on a support structure, each provided with means of grasping an item, this group being able to adopt a contracted configuration in which the modules are separated by a predetermined first spacing, and a deployed configuration in which the modules are separated by a predetermined second spacing, greater than the first spacing.
means of linking one module to another, able to control the change of the group of modules from its contracted configuration to its deployed configuration,
means of controlling the movement of the group of modules with respect to the support structure, in which device the linking means comprise a lever mounted such that it rotates on one of the modules about an axis substantially perpendicular to the direction of movement, this lever being provided at a first end with a first finger running in a groove formed transversely on the other module, and at a second end with a second finger running in a groove formed longitudinally in the support structure, this groove comprising a first section substantially parallel with the longitudinal direction of movement, and a second section forming an angle with the said direction of movement.

This device makes it possible to carry out a reliable transfer of items from the loading station to the unloading station. The regulation of the pitch during the transfer is provided simply and automatically.

This device can have the following features, alone or in combination:
the groove comprises a first and a second section substantially parallel with the longitudinal direction of movement, connected by an intermediate section forming an angle with the said direction of movement;
the first finger is in the form of a running wheel mounted such that it rotates at the first end of the lever whilst cooperating in a rolling manner with the groove.
the second finger is in the form of a running wheel mounted such that it rotates at the second end of the lever whilst cooperating in a rolling manner with the groove;
the support structure comprises a longitudinal rail, each module comprising a slider by the intermediary of which it is attached to the rail;
the support structure comprises two parallel longitudinal rails, each module comprising two sliders by the intermediary of which it is attached to the rails;
the means of controlling the movement of the group of modules comprise a belt coupled to a motor and fixed to one of the modules;
the belt is fixed to the module by the intermediary of a flange integral with the latter;
each module comprises a telescopic transverse arm which carries the grasping means at one end;
the support structure comprises an actuator able to move the said arm transversely;
the arm is provided with a protruding finger, the said actuator is in the form of a longitudinal rod that is moveable transversely and able to push the said finger;
the grasping means are in the form of an articulated clamp;

According to a second aspect, the invention proposes a machine for manufacturing receptacles from blanks, which comprises:
a heating station where the blanks are heated whilst in progress,
a molding station where the receptacles are formed conjointly in groups of at least two receptacles, by blowing or drawing-blowing, from groups of at least two blanks, and
a device for transferring groups of blanks from the heating station to the molding station, such as described above.

According to a third aspect, the invention proposes a method of manufacturing receptacles from blanks, which comprises the steps consisting in:
heating the blanks whilst in progress at a heating station,
transferring the blanks in groups of at least two blanks from the heating station to a molding station, during which the spacing between the blanks is increased;
forming the receptacles conjointly in groups of at least two receptacles, by blowing or drawing-blowing, from the transferred groups of blanks, a method in which the transfer step is carried out by means of a transfer device such as described above, this transfer step comprising a slowing down or a momentary immobilization, for a predetermined duration, of the groups of blanks between the heating station and the molding station.

Other purposes and advantages of the invention will appear on reading the following description given with reference to the appended drawings in which:

FIGS. 2 to 4 are perspective views showing, in three different positions, a transfer device according to the invention, designed to equip a molding machine such as shown in FIG. 1;

FIGS. 5 to 7 are enlarged perspective views from above of the transfer device shown in FIGS. 2 to 4, in the same positions;

FIGS. 11 to 13 are top views of the device shown in FIGS. 2 to 4, 5 to 7 and 8 to 10, in the same positions;

FIGS. 14 to 16 are bottom views of the device shown in FIGS. 2 to 4, 5 to 7, 8 to 10 and 11 to 13, in the same positions;

Figure 1:
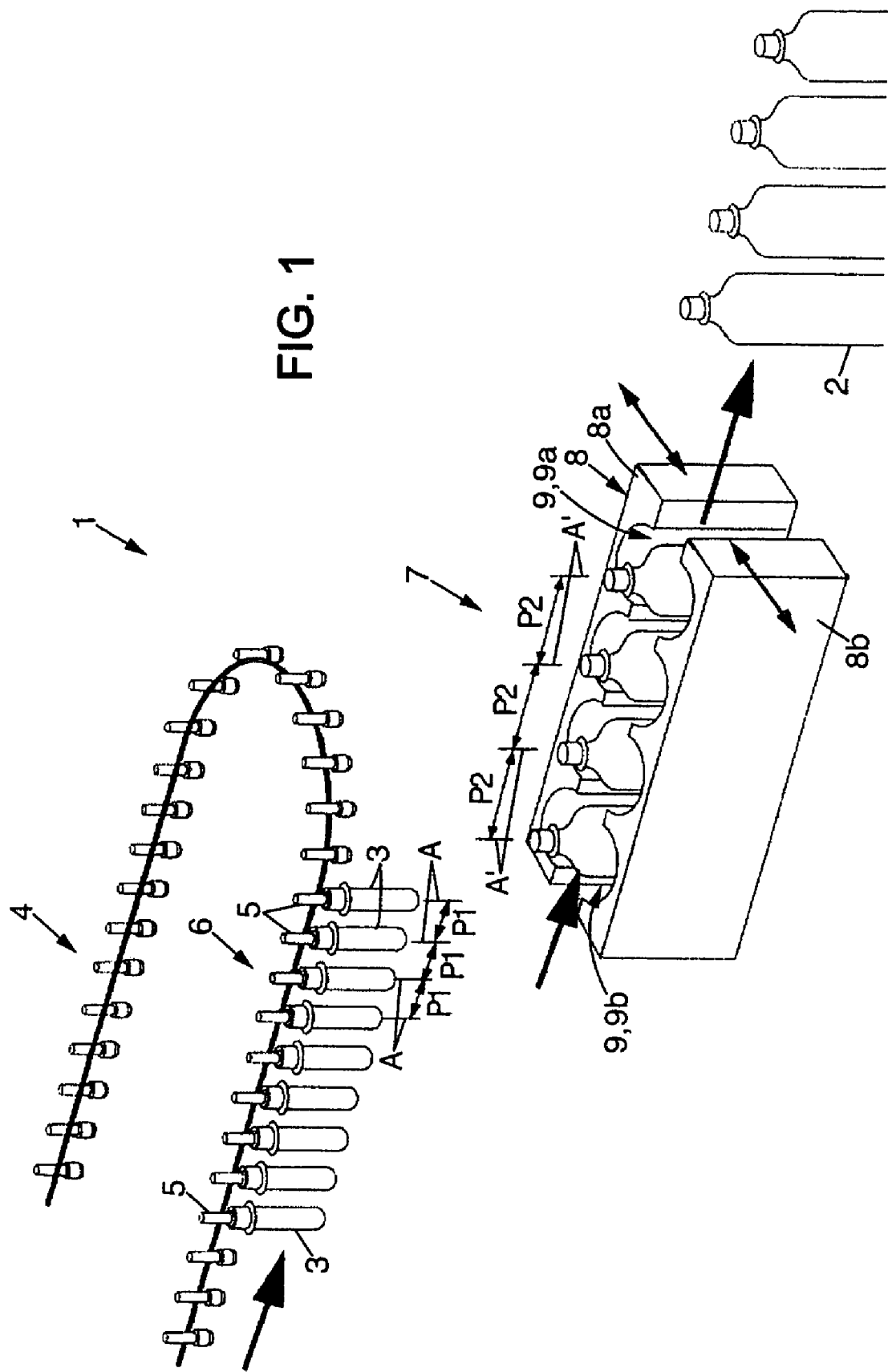
FIG. 1 is a perspective diagrammatic view showing a machine for molding receptacles from blanks.

FIG. 1 is a diagrammatic representation of a machine 1 for molding receptacles 2 from blanks 3—in practice these blanks are preforms made of thermoplastic material.

This machine 1 comprises a carousel 4 provided with a chain upon which the blanks 3 are mounted such that they are suspended from whirlers 5 which drive them in rotation at least when they arrive at a heating station 6 where they are heated whilst in progress for example by being exposed to the radiation of tubular infrared radiation lamps (not shown).

This heating principle is known to those skilled in the art. It will not be described in greater detail.

It will be explained however that, in order to heat a large number of blanks 3 at the same time, they are held on the carousel 4 with a predetermined constant first spacing P1 between their respective axes of rotation A (substantially merged with their axes of revolution), hereafter called "primary pitch". This primary pitch P1 depends on the spacing between the whirlers 5, defined according to the diameter of the blanks 3. Thus, for blanks 3 having a diameter of 25 mm, the primary pitch P1 is for example between 50 and 60 mm.

As shown in FIG. 1, the machine 1 also comprises a molding station 7 equipped with a mold 8 having several impressions 9 (four in this instance), into which the hot blanks 3 are unloaded after having been transferred from the heating station 6 by means of a transfer device 10 which will be described in detail below.

As can be seen in FIG. 1, the mold 8 comprises two half-molds 8a, 8b in each of which are formed a series of half-impressions 9a, 9b, the receptacles 2 being formed by blowing or by drawing-blowing from the hot blanks 3, then evacuated in order to be filled immediately or stored as they are for subsequent filling.

For obvious reasons, the spacing between the axes A of the blanks 3 during their unloading into the mold 8 must be equal to the spacing between the impressions 9, that is to say the final spacing between the axes A' of the receptacles 2. This spacing P2, defined as the distance between the axes A' of the receptacles is hereafter called the "secondary pitch". It is bigger than the primary pitch P1. For example, for receptacles 2 of diameter 100 mm, the secondary pitch P2 is 150 mm.

As mentioned above, the molding machine 1 comprises a device 10 for transferring blanks 3 from the heating station 6, where the blanks 3 are loaded, to the molding station 7, where the blanks 3 are unloaded.

As will be seen below, the transfer device 10 makes it possible to adjust the spacing between the blanks 3 during the transfer, from the primary pitch P1 at the time of loading, to the secondary pitch P2 at the time of unloading.

The transfer device 10 extends between a loading station 13, opposite the heating station 6, and an unloading station 14, opposite the molding station 7; it comprises a support structure 15, mounted on a chassis (not shown) of the machine 1, which comprises two parallel rails 16, 17 defining a longitudinal direction L along which the preforms are moved between the loading station 13 and the unloading station 14.

The transfer device 10 comprises a group 18 of at least two modules 19 mounted such that they are moveable in the longitudinal direction L, on the support structure 15. In the following text, a location close to the loading station 13 is called upstream, whilst a location close to the unloading station 14 is called downstream.

Each module 19 is in the form of a carriage sliding on the rails 16, 17 and equipped with means 20 of grasping a blank 3, in the form of an articulated clamp able to grasp the blank 3 by its neck, above the collar with which the latter is generally provided.

The group 18, hereafter called a train, comprises a number of carriages 19 equal to the number of blanks 3 to be transferred from the loading station 13 to the unloading station 14, this number being equal to the number of impressions 9 of the mold 8. This number is greater than or equal to two since the context is that of a molding machine with a multi-impression mold; in the embodiment shown in the figures, this number is equal to four; the mold 8 comprises four impressions 9, the train 18 comprises four carriages 19a, 19b, 19c and 19d.

Figure 6:
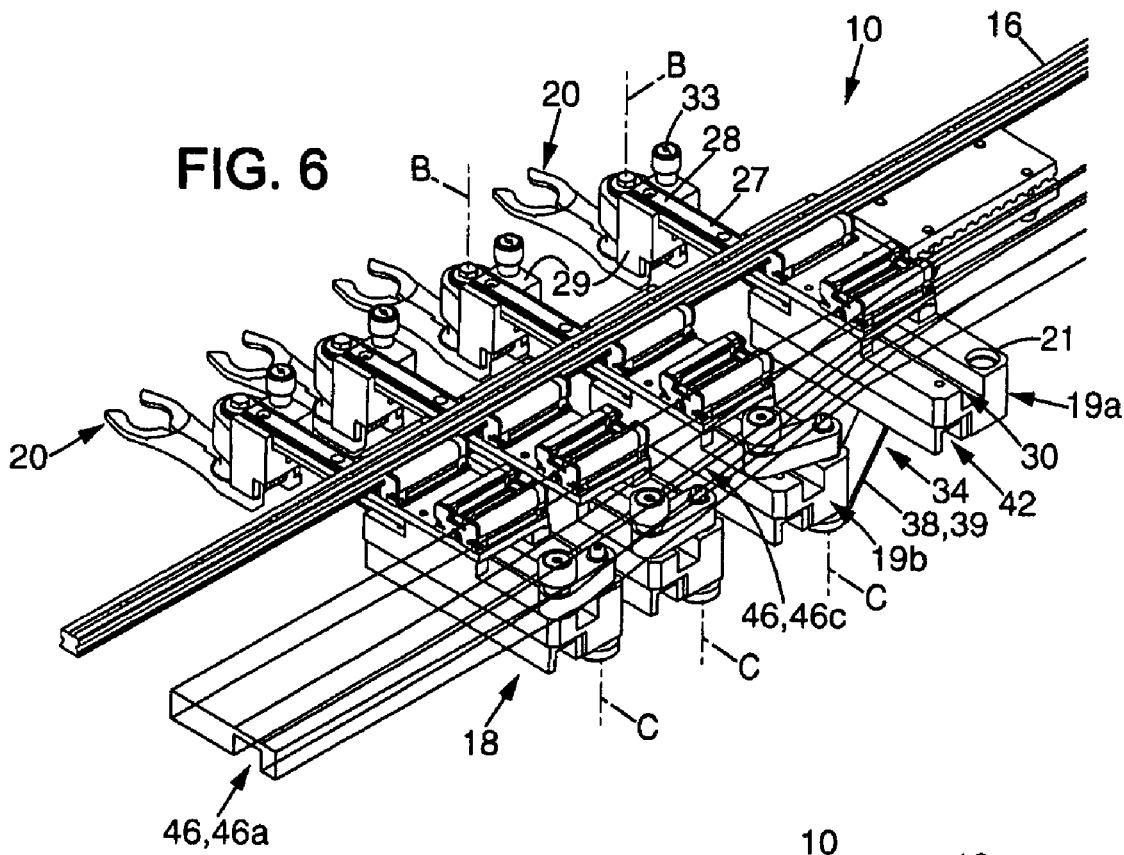
Figure 7:
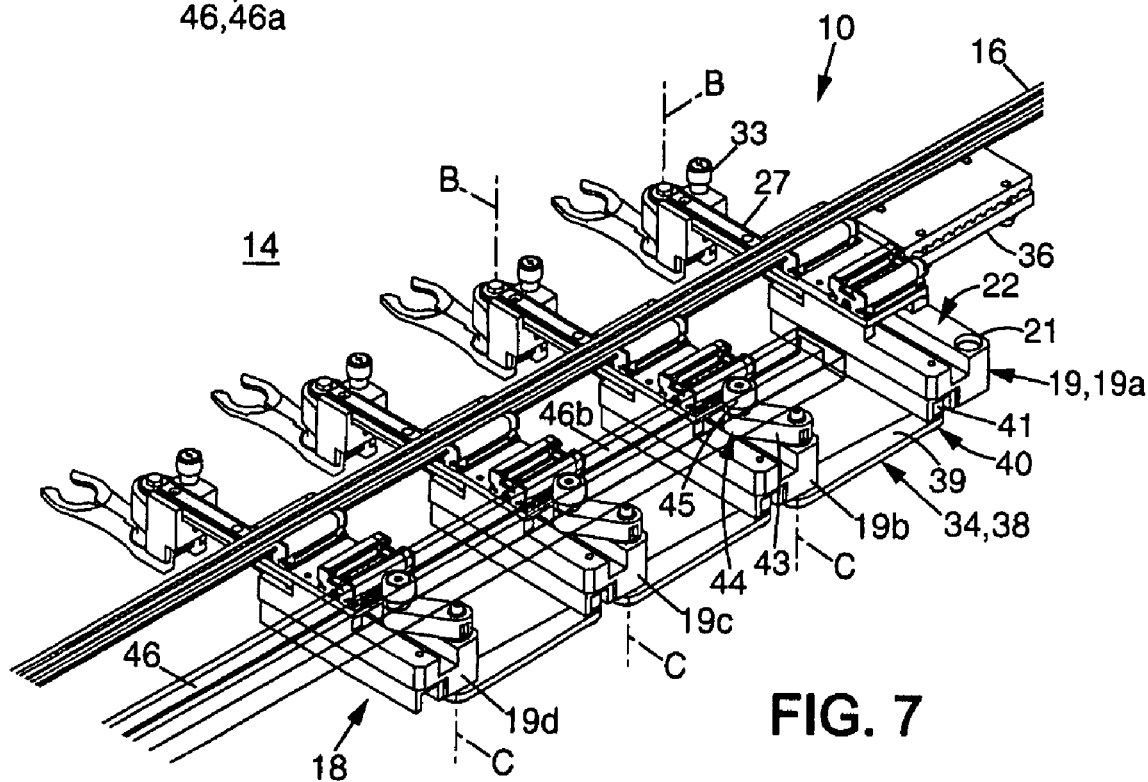

As seen in FIGS. 5 to 7 in particular, each carriage 19 comprises a substantially parallelepipedic main body 21 having an upper face 22, facing the rails 16, 17, and an opposite lower face 23.

The carriage 19 is attached to the rails 16, 17 by means of two sliders 24, 25 fixed to the main body 21, on the side of its upper face 22, each slider 24, 25 having a longitudinal groove 26 having a profile complementary to that of the rail 16, 17 with which it cooperates in sliding: in the example illustrated in the figures, these profiles are of the mortise and tenon type. In order to allow sliding without seizing of the slider 24, 25 with respect to the corresponding rail 16, 17, the slider 24, 25 is preferably made from a plastic having a low coefficient of friction, nylon for example, or made in the form of a slider with running wheels, whilst the rail 16, 17 is itself made from a metallic material, steel for example, in particular in order to have good resistance to flexion over the entire length of the transfer device 10.

Moreover, as shown in FIGS. 5 to 7, each carriage 19 comprises a telescopic transverse arm 27 which carries at a forward end 28 a support 29 on which is mounted the clamp 20 which, for grasping a blank 3, comprises two jaws 20a, 20b articulated on the support 29 about a common axis B which, being parallel with that A of the blank 3, is substantially perpendicular to the longitudinal direction L of movement.

The arm 27 is mounted telescopically in a groove 30 formed transversely in the main body 21 of the carriage 19 such that the arm 27 can slide transversely with respect to the latter between a retracted position, illustrated in FIG. 5, where the arm 27 is withdrawn into the groove 30, the clamp 20 then being in the vicinity of the body 21, and an emerged position, illustrated in FIGS. 6 and 7, where the arm 27 extends like a cantilever with respect to the body 21, the clamp 20 being distanced from the latter.

The change from the retracted position to the emerged position takes place under the effect of an actuator 31 such as a longitudinal actuating bar mounted on the support structure 15 whilst being transversely movable with respect to the latter, this bar 31 comprising a groove 32 which cooperates with a finger 33 which protrudes from the support 29 of the clamp 20.

On leaving the retracted position of the arm 27, the forward movement of the bar 31 pushes the finger 33 in this direction, which cause the movement of the arm 27 towards its emerged position.

Conversely, starting from the emerged position of the arm 27 the backward movement of the bar 31 pushes the finger 33 in that direction, which causes the movement of the bar 27 towards its retracted position.

The occasions on which these actions occur will be described below.

The cohesion of the train 18 is ensured by linking means 24, in particular sliders, by which the carriages 19a-d are attached in pairs. The movement of one 19a of them, located at an end called the downstream end of the train 18 and called the leading carriage 19a, causes the movement all-together of all of the carriages 19a-d.

The transfer device 10 comprises means 35 of controlling the movement of the train 18 between:
  a loading position, shown in FIGS. 5, 8, 11, 14, 17, in which the train 18 is at the loading station 13, and
  an unloading position, separated from the loading position by a predetermined distance depending on the configuration of the molding machine 1 and in which the train 18 is at the unloading station 14 (FIGS. 4, 3, 10, 13, 16, 19).

The means 35 of controlling the movement of the train 18 comprise a pulley (not shown), whose rotation is driven by a motor-reduction gear (not shown) connected to an electronic unit (not shown) for controlling the machine 1, and to which is coupled a drive belt 36 fixed to the leading carriage 19a by the intermediary of a flange 37 integral with the body 21 of the latter.

The train 18 is designed to adopt:
  in its loading position, a contracted configuration in which the spacing E between the carriages 19a-d (in practice this spacing E is measured by the distance between the axes B of articulation of the clamps 20) is equal to the primary pitch P1, and
  in its unloading position, a deployed configuration in which the spacing E between the carriages 19a-d is equal to the secondary pitch P2.

As will be seen, the linking means 34 are designed to control the adjustment of the spacing E between the carriages 19a-d automatically during the movement of the train 18.

The linking means 34 between two successive carriages 19a, 19b, that is to say a carriage 19a called downstream (for example the leading carriage 19a) and a carriage 19b called downstream, adjacent to the downstream carriage 19a (in this example it is the second carriage 19b of the train 18, starting from the leading carriage 19a), will now be described.

As can be seen in FIGS. 6 to 10, the linking means 34 comprise a lever 38 mounted such that it is articulated on the upstream carriage 19b about an axis C of rotation substantially parallel with the axis B of articulation of the clamp 20 (and therefore perpendicular to the direction L of movement of the train 18).

This lever 38 comprises two parts which extend on either side of the axis C, namely:

on the downstream side (that is to say on the side of the leading carriage 19a) and on the side of the lower face 23 of the body 21, a rod 39 provided at one end 40, called the downstream end, with a first finger 41 running in a groove 42 formed transversely on the leading carriage 19a on the side of its lower face 23, and on the upstream side and on the side of the upper face 22, a rod 43 provided at an upstream end 44 with a second finger 45 running in a groove 46 formed longitudinally in a slide 47 of the support structure 15, disposed parallel with the rails 16, 17.

In order to minimize friction, the fingers 41, 45 are made in the form of running wheels mounted such that they are free to rotate with respect to the rod 39 and the rod 43 respectively.

The first finger 41 therefore cooperates whilst rolling with the groove 42, which is itself produced in the form of an added profile with a U-shaped section, fixed on the body 21 of the leading carriage 19a, on the side of its lower face 23.

The second finger 45 cooperates whilst rolling with the groove 46, which comprises three successive sections, namely:
  a first straight section 46a, which extends, at the loading station 13, substantially parallel with the longitudinal direction L of movement of the train 18,
  a second straight section 46b, which extends, at the unloading station 14, substantially parallel with the longitudinal direction L of movement of the train 18, and
  an oblique intermediate section 46c, which connects the straight sections 46a, 46b together and extends between the loading station 13 and the unloading station 14, forming an angle α with the direction of movement of the train 18.

As can be seen in particular in FIGS. 11 to 13, the straight sections 46a, 46b are offset both transversely and longitudinally, the second straight section 46b being offset towards the front with respect to the first straight section 46a, the intermediate section 46c, running from upstream towards downstream, constituting a bifurcation from the rear towards the front in order to form the junction between the sections 46a, 46b.

The manufacture of the receptacles 2 from the blanks 3 comprises:
  a step of heating the blanks 3, in progress, at the heating station 6,
  a step of transferring the blanks 3 in groups of four (in the embodiment shown) from the heating station 6 to the molding station 7,
  a step of forming receptacles 2 conjointly in groups of four, by blowing or drawing-blowing, from groups of transferred blanks 3.

The transfer takes place as follows.

Figure 8:
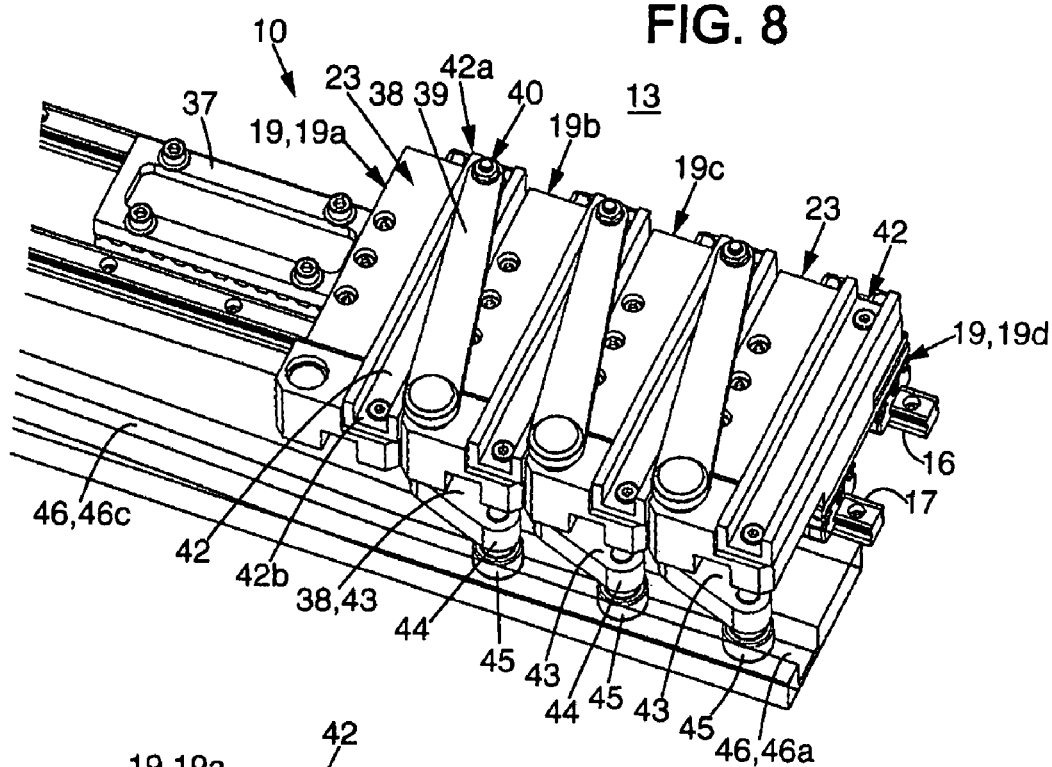
FIGS. 8 to 10 are enlarged perspective views from below of the device shown in FIGS. 2 to 4 and 5 to 7, in the same positions.
Figure 9:
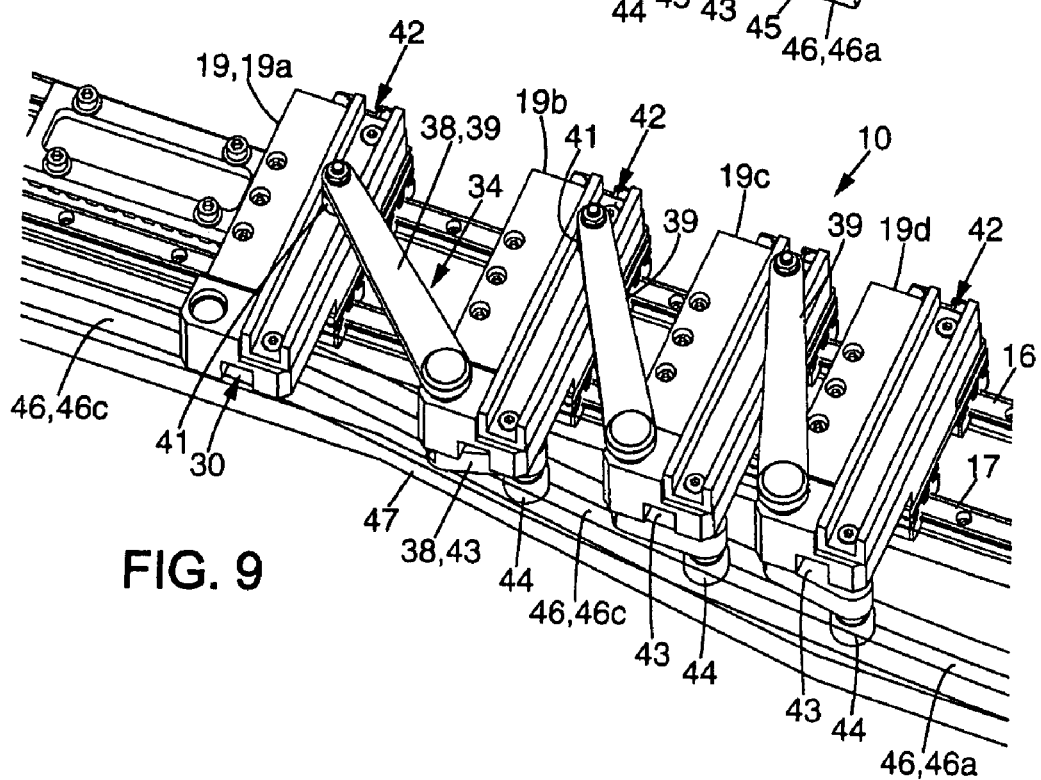
Figure 10:
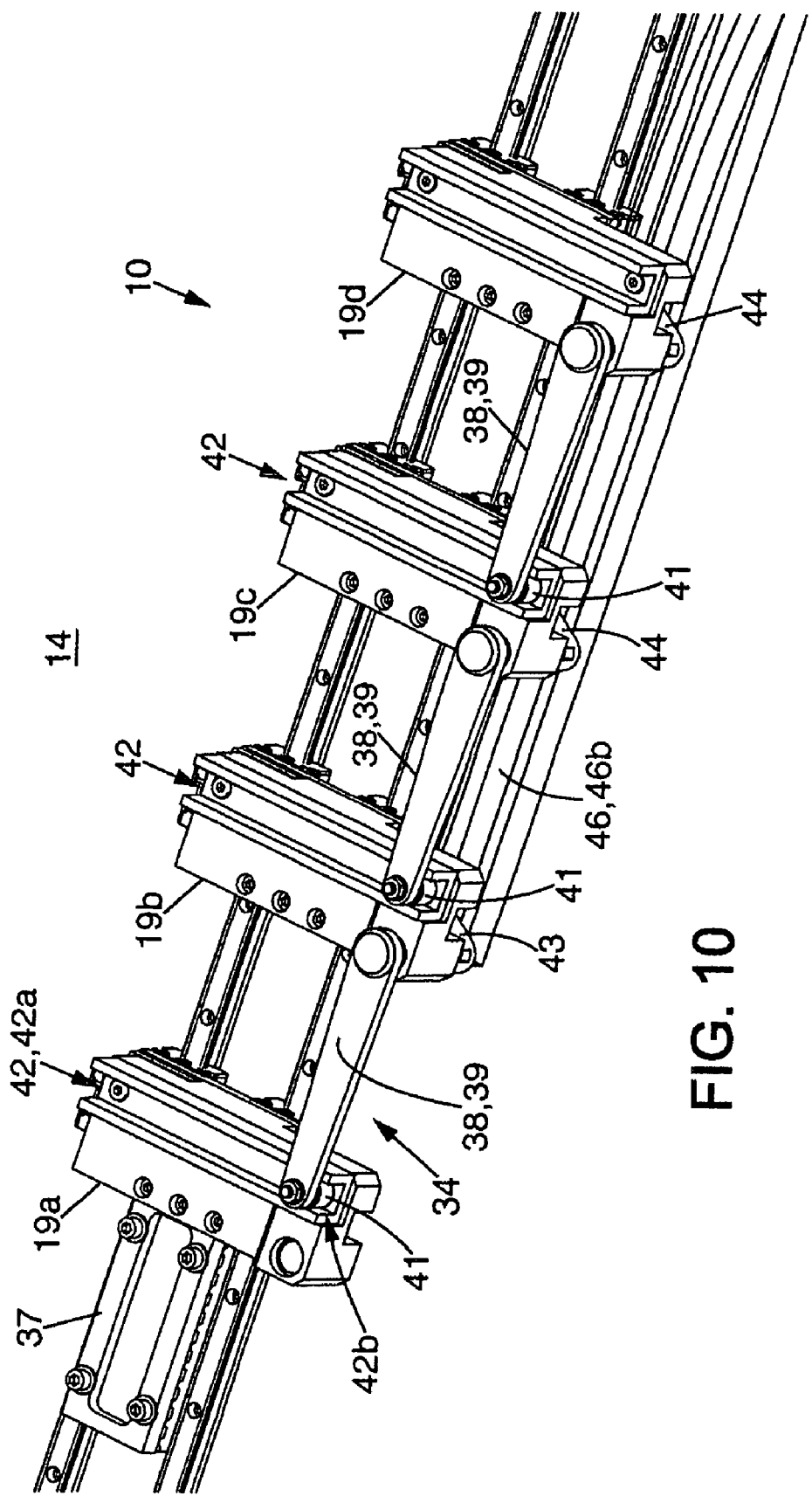
Figure 17:
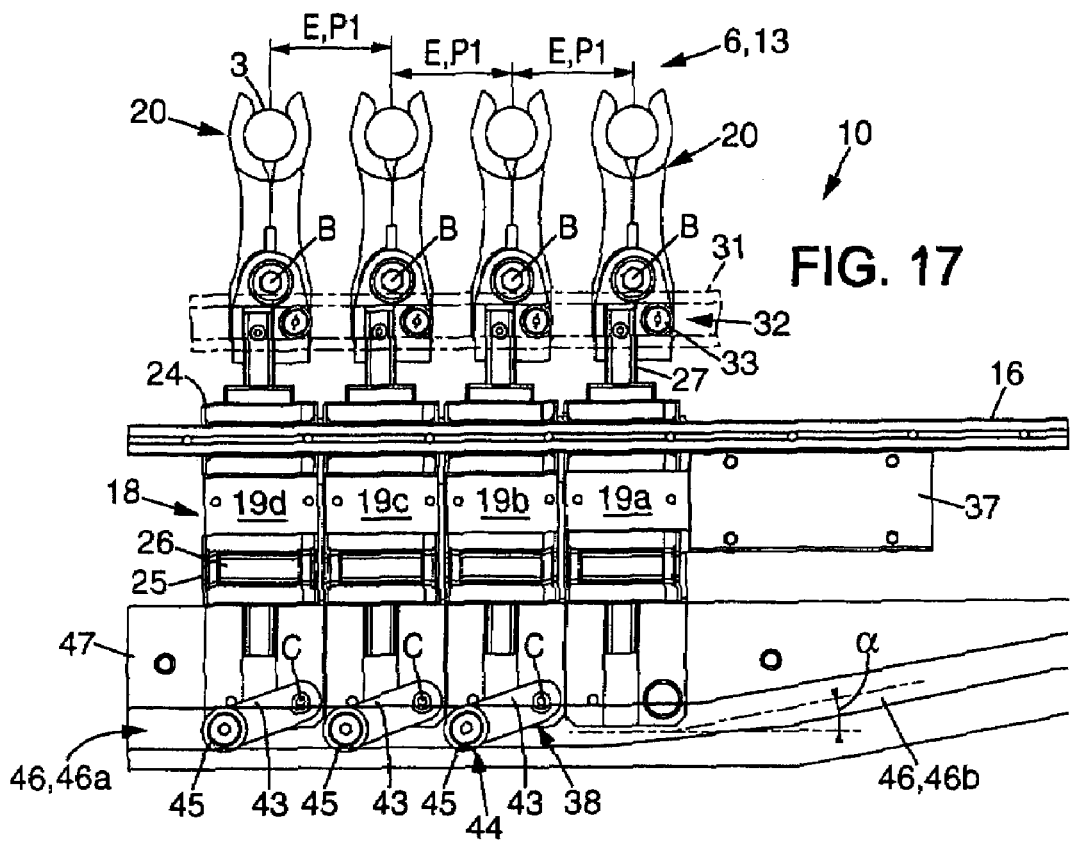
FIGS. 17 to 19 are enlarged top views of the device shown in FIGS. 14 to 16, in the same positions.
Figure 18:
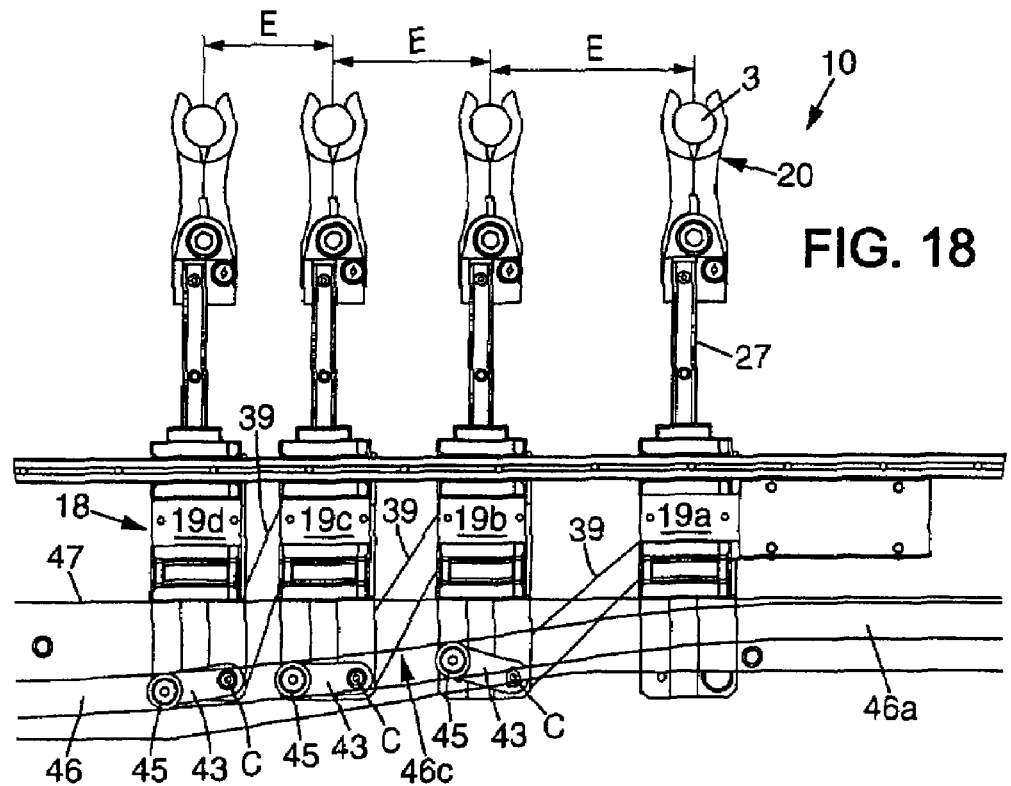
Figure 19:
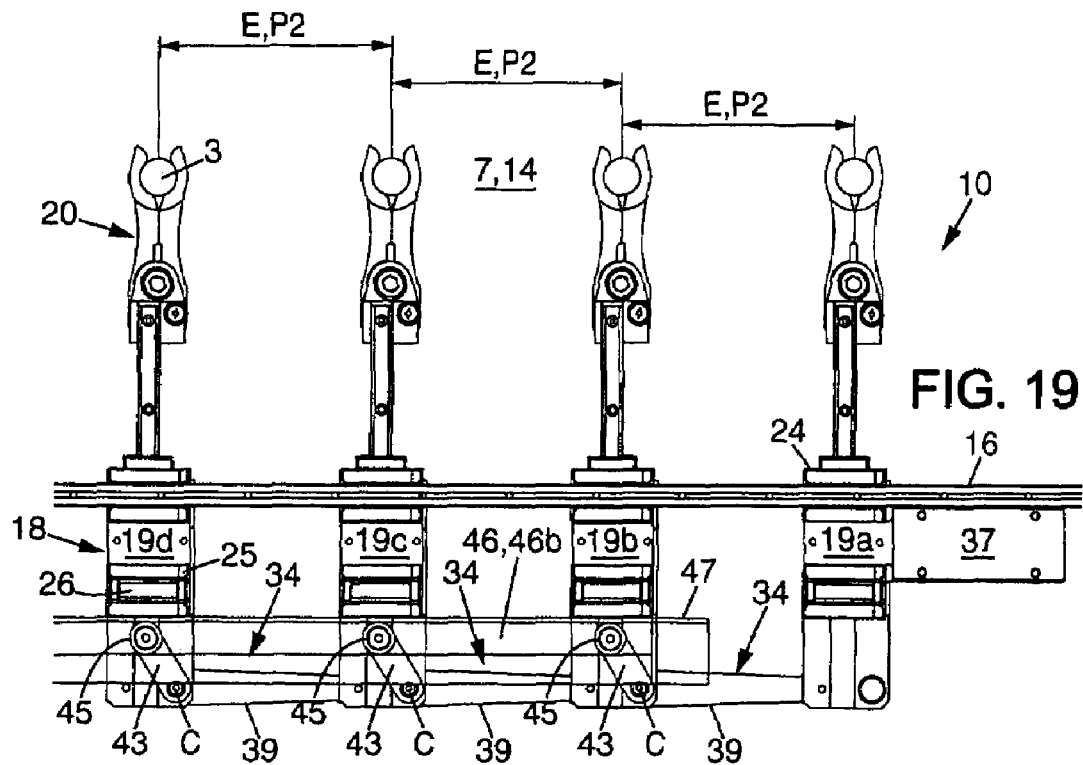
Figure 20:
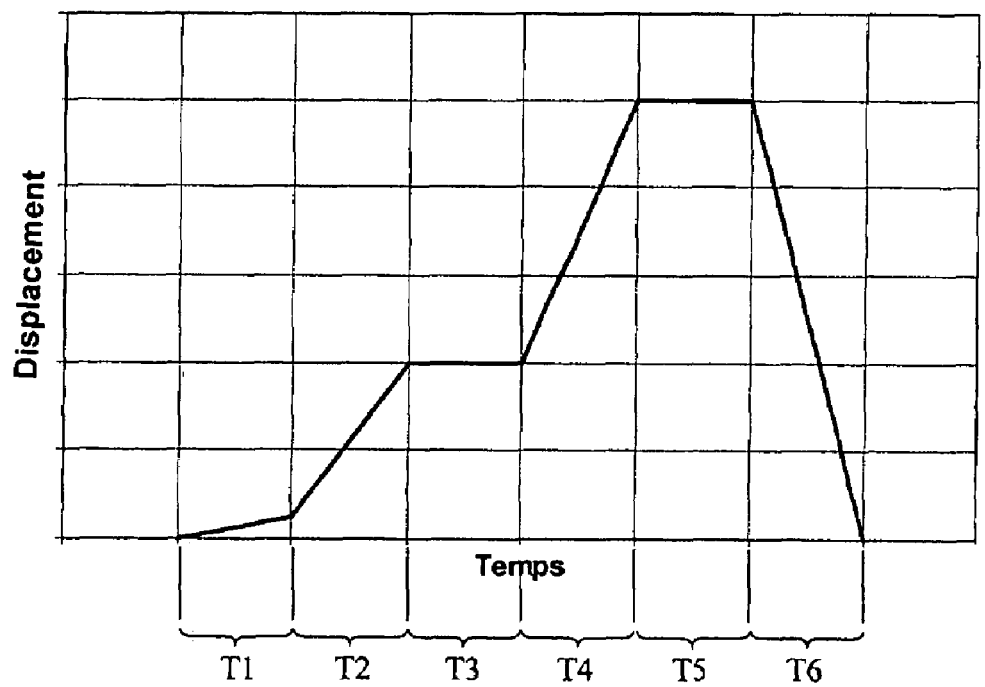
FIG. 20 is a graph illustrating the movement in time of a group of modules of a transfer device such as shown in FIGS. 2 to 19.

The train 18 is initially in its loading position. In this position, all three of the second fingers 45 are in the first straight section 46a, as shown in FIG. 8, which holds the levers 38 in an orientation where, with the first fingers 41 being at a front end 42a of the grooves 42, the carriages 19a-d are grouped whilst being adjacent to each other. The train 18 is therefore in its contracted configuration, where the spacing E between the carriages 19a-d is equal to the primary pitch P1.

Starting from its loading position, and during a first predetermined time period T1, the train 18 moves parallel with the group of blanks 3 to be loaded after the latter have left the heating station 6. The speed of the train 18 increases until it reaches that of the carousel 4 at a time called the loading time, when the clamps 20 are deployed under the action of the bar 31, in order to grasp the group of hot blanks 3 to be transferred, these being detached from their whirlers 5 by means of a release mechanism (not shown).

The train 18 then undergoes, during a second predetermined time period T2, a movement during which it is separated from the loading station 13. The train 18 is then slowed down or, if necessary, immobilized in a buffer zone, intermediate between the loading station 13 and the unloading station 14, during a third predetermined time period T3 during which the evacuation from the mold 8 of the receptacles formed from previously transferred performs takes place, by means of a second train (not shown) running partly on the rails 16, 17 of the transfer device 10 and partly on a conveyor (not shown) for transferring the recipients 2 to a filling station or to a storage station (not shown).

This buffer zone, in which the train 18 moves momentarily at a reduced speed or is momentarily immobilized, is necessary to ensure the transition between a continuous production mode (at the heating station 13) to a sequential production mode (at the molding station 7).

The train 18 then undergoes another movement during a fourth predetermined time period T4 during which the second fingers 45 pass through the intermediate section 46c, which acts on each finger 45 like a cam surface and, pushing the finger 45, which behaves like a cam follower, transversely forwards whilst the axis C of the lever 38 follows a straight longitudinal path, causes the rotation of the latter about its axis C, which moves the first finger 41 towards a rear end 42b of the groove 42, the carriages 19a-d then being ungrouped (FIGS. 3, 6, 9, 12, 15, 18).

Thus, when the second running wheel 45 of the last carriage 19d has left the intermediate section 46c in order to engage in the second straight section 46b, the train 18 is in its deployed configuration.

When the train 18 arrives at the unloading station 14, it is once again immobilized for a fifth predetermined time period T5, during which the hot blanks 3 are unloaded into the mold 8 (FIGS. 4, 7, 10, 13, 16, 19).

Once the half-molds 8a, 8b are closed over the blanks 3, the bar 31 is moved transversely towards the rear, the clamps 20 being in their retracted position again.

Once the unloading is completed, the train 18 returns, during a sixth predetermined time period T6, to its loading position, whilst regaining its contracted position allowing it to proceed again to a new loading of a group of blanks 3.

The cycle is repeated as many times as necessary for the production of receptacles 2.

The device 10 which has just been described allows the rapid and reliable transfer of blanks 3 from the heating station 6 to the molding station 7.

The grouping and ungrouping of the carriages 19a-d is carried out passively by simple cooperation of cams (the running wheels 41 and 45) following a cam track (the groove 46). Only the driving of the train 18 by the belt 36 necessitates provision of energy. Moreover, the speed profile of the train 18, carried out by programming the control unit of the machine 1, does not have to take account of the modification of the configuration of the train 18, the change from its deployed configuration to its contracted configuration, and vice-versa, being carried out mechanically and automatically. This results in a simplification of the programming of the machine 1.

Moreover, the device 10 can be modified according to the number of receptacles 2 to be formed in each molding operation. In fact, it suffices to attach or detach carriages 19 of the train 18 in order to match their number to that of the blanks 3 to be transferred, without it being necessary to modify the structure of the machine 1, whose cost appears, because of this, to be modest in comparison with known variable-pitch machines.

Finally, even though the invention has been described with reference to the handling of blanks from which receptacles are manufactured, it can be applied more generally to the handling of any type of item, insofar as this handling necessitates a transfer of items with modification of the spacing between them.

The invention claimed is:

1. Device for transferring items from an items loading station to an items unloading station, which comprises:
    a group of modules mounted such that they can move in a longitudinal direction (L) on a support structure, each provided with means of grasping an item, this group being able to adopt a contracted configuration in which the modules are separated by a predetermined first spacing, and a deployed configuration in which the modules are separated by a predetermined second spacing, greater than the first spacing,
    means of linking one module to another, able to control the change of the group of modules from its contracted configuration to its deployed configuration,
    means of controlling the movement of the group of modules with respect to the support structure,
    wherein the linking means comprise a lever mounted such that it rotates on one of the modules about an axis (C) substantially perpendicular to the direction (L) of movement, this lever being provided at a first end with a first finger running in a groove formed transversely on the other module, and at a second end with a second finger running in a groove formed longitudinally in the support structure, this groove comprising a first section substantially parallel with the direction (L) of movement, and a second section forming an angle with the said direction (L) of movement.

2. Device according to claim 1, wherein the groove comprises a first section and a second section substantially parallel with the direction (L) of movement, connected by an intermediate section forming an angle with the said direction (L) of movement.

3. Device according to claim 1, wherein the first finger is in the form of a running wheel mounted such that it rotates at the first end of the lever whilst cooperating in a rolling manner with the groove.

4. Device according to claim 1, wherein the second finger is in the form of a running wheel mounted such that it rotates at the second end of the lever whilst cooperating in a rolling manner with the groove.

5. Device according to claim 1, wherein the support structure comprises a longitudinal rail, and in that each module comprises a slider by the intermediary of which it is attached to the rail.

6. Device according to claim 5, wherein the support structure comprises two parallel longitudinal rails and in that each module comprises two sliders by the intermediary of which it is attached to the rails.

7. Device according to claim 1, wherein the means of controlling the movement of the group of modules comprise a belt coupled to a motor and fixed to one of the modules.

8. Device according to claim 7, wherein the belt is fixed to the module by the intermediary of a flange integral with the latter.

9. Device according to claim 1, wherein each module comprises a telescopic transverse arm which carries the grasping means at one end.

10. Device according to claim 9, wherein the support structure comprises an actuator able to move the said arm transversely.

11. Device according to claim 10, wherein the arm is provided with a protruding finger and in that the said actuator is in the form of a longitudinal rod that is moveable transversely and able to push the said finger.

12. Device according to claim 1, wherein the grasping means are in the form of an articulated clamp.

13. Machine for manufacturing receptacles from blanks, which comprises:

a heating station where the blanks are heated whilst in progress, a molding station where the receptacles are formed conjointly in groups of at least two receptacles, by blowing or drawing-blowing, from groups of at least two blanks, and a device for transferring groups of blanks from the heating station to the molding station, according to claim 1.

14. Method of manufacturing receptacles from blanks, which comprises the steps consisting in:

heating the blanks whilst in progress at a heating station, transferring the blanks in groups of at least two blanks from the heating station to a molding station, during which the spacing between the blanks is increased;

forming the receptacles conjointly in groups of at least two receptacles, by blowing or drawing-blowing, from the transferred groups of blanks, wherein the transfer step is carried out by means of a transfer device according to claim 1, and in that this transfer step comprises a slowing down or a momentary immobilization, for a predetermined duration, of groups of blanks between the heating station and the molding station.

\* \* \* \* \*